Sept. 16, 1969   Y. LE MASSON   3,467,136
REGULATORS OF A GAS REQUIRED FOR BREATHING OF
THE PNEUMATIC VALVE TYPE
Filed Feb. 10, 1967
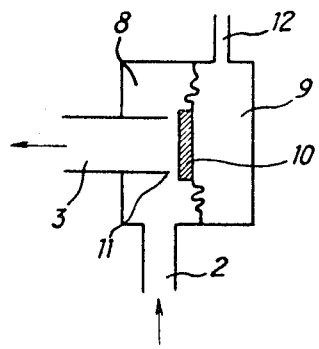
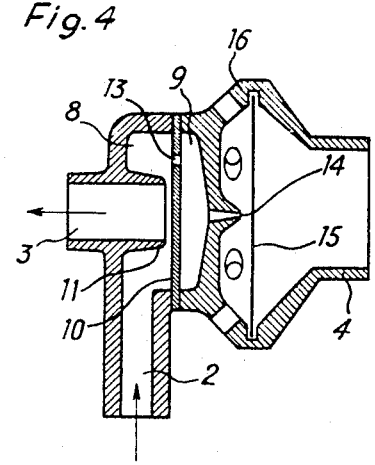
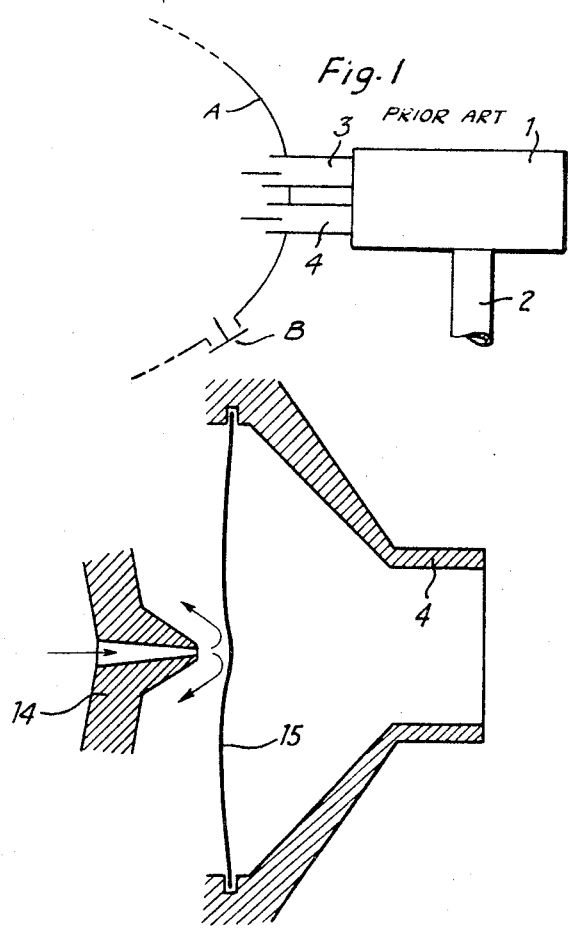
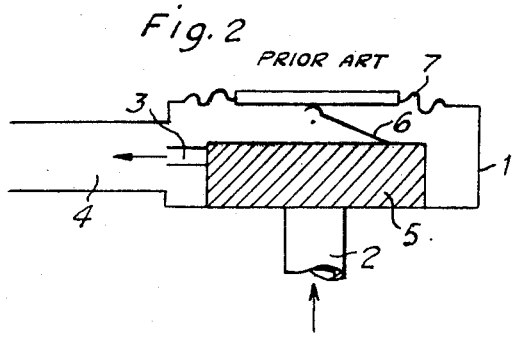

United States Patent Office 3,467,136
Patented Sept. 16, 1969

3,467,136
REGULATORS OF A GAS REQUIRED FOR BREATHING OF THE PNEUMATIC VALVE TYPE
Yves le Masson, Etampes, France, assignor to Societe Industrielle des Etablissements Piel (S.I.D.E.P.), Etampes, France, a company of France
Filed Feb. 10, 1967, Ser. No. 615,166
Int. Cl. F16k 31/385
U.S. Cl. 137—489                                    13 Claims

ABSTRACT OF THE DISCLOSURE

Regulator for controlling the operation of a valve on the path of a respiratory gas between a source of this gas and a breathing zone to which it is to be supplied, of the type wherein said operation depends on the value of a control pressure varying with the position of a diaphragm sensitive to variation in breathing, characterized by the fact that it comprises a piloting chamber provided with at least a gas inlet for continuously supplying the piloting chamber with a gas in order to obtain therein a pressure of gas constituting said control pressure, said piloting chamber being provided with at least a gas outlet for obtaining a leakage jet of gas continuously leaking from the piloting chamber, and said sensitive diaphragm being provided on the outside of said piloting chamber, opposite and at a distance from said outlet on the path of said jet, whereby a displacement of said diaphragm modifies said pressure of gas in the piloting chamber through action on said leakage jet.

The present invention relates to regulators mounted on the path of a respiratory gas, between a source of this gas, generally a constant-pressure source, and a zone to which it is to be supplied in order to maintain the breathing of a person, so as to control the conditions of supply to the demands of breathing.

It relates more precisely to regulators for controlling the operation of a valve on the path of a respiratory gas between a source of this gas and a breathing zone to which it is to be supplied, of the type wherein said operation depends on the value of a control or piloting pressure varying with the position of a diaphragm sensitive to variation in breathing.

In known regulators of this type, the action of the sensitive diaphragm on the value of the control pressure is obtained through a mechanism, of which one member, which is generally a lever, is in continuous contact or connection with one face of the diaphragm, and it is found in service that the repeated actions to which the diaphragm is subjected due to the incessant variations of the breathing demand, can cause relatively rapid wear of the part of this diaphragm which is in contact with the lever referred to above. As a result, it is either necessary to change this diaphragm periodically or it is essential to utilize specially designed diaphragms (moulded diaphragms, etc.) in order to support the connection or the contact with the member, and involving the additional disadvantage of a corresponding reduction in the sensitivity of operation of the diaphragm.

The present invention is directed in the first place to overcoming these drawbacks and to permit the use as a sensitive diaphragm of an ordinary diaphragm which may for example have the form of a single flat disc, not subject to the wear referred to above.

The invention is also directed to the elimination of the lever or other mechanism which, in known regulators, is fixed to the back of the sensitive diaphragm so as to transmit its action.

The invention is also intended to permit a reduction of the dimensions of the regulator by the use of a diaphragm of very small size, without adversely affecting its sensitivity.

By way of example, the invention thus permits the use of a sensitive diaphragm which takes the form of a simple flat and thin washer of rubber of low Shore, having a thickness as small as a few tenths of a millimeter and preferably less than $5/10$ of a millimeter, for example from $3/10$ to $4/10$ mm. and a diameter preferably less than 5 cm., and for example of the order of 3 cm., and which can react efficiently to a breathing demand which produces on the diaphragm a variation of pressure as low as 0.5 g./sq. cm.

To this end, according to the invention, provision is made for constituting the control pressure by the pressure of a gas in a chamber while producing in this chamber a continuous circulation of the said gas introduced into the chamber through at least one supply inlet and evacuated from the chamber by at least one leakage outlet, and providing the sensitive diaphragm on the outside of the chamber opposite and at a distance from the leakage outlet on the path of the leakage of gas, so that a simple movement of the diaphragm in the direction of the leakage outlet or in the opposite direction is sufficient to modify the leakage flow rate and therefore of the pressure of gas which exists in the chamber.

In other words, the regulator according to the invention, of the above described type, is characterized by the fact that it comprises a piloting chamber provided with at least a gas inlet for continuously supplying the piloting chamber with a gas in order to obtain therein a pressure of gas constituting said control pressure, said piloting chamber being provided with at least a gas outlet for obtaining a leakage jet of gas continuously leaking from the piloting chamber, and said sensitive diaphragm being provided on the outside of said piloting chamber, opposite and at a distance from said outlet on the path of said jet, whereby a displacement of said diaphragm modifies said pressure of gas in the piloting chamber through action on said leakage jet.

In the arrangements as defined above, the sensitive diaphragm acts by continuous contact with a flow of gas, to the exclusion of any contact with a mechanical transmission member, and it should be noted that the rate of flow of this current is never interrupted during operation; it is only varied by the displacement of the diaphragm.

Repeated observations lead to the opinion that the main effect of the displacement of the diaphragm on the leakage jet is a modification of curvature of this jet in contact with the diaphragm, this modification resulting in a variation of the speed of the molecules of gas, and therefore a variation in the pressure drop due to the leakage.

The inlet and outlet of the gas may advantageously be formed by calibrated orifices, for example orifices of jet nozzles.

It is desirable to give the inlet orifice of the piloting chamber a section of passage which is as small as possible in order to prevent the flow rate of operation from acting adversely on the economy of breathable gas.

A low value of the section of passage of the leakage orifice is also favorable to the sensitivity of the controls, but it is however necessary to avoid an excessive reduction of the leakage flow rate, which would be liable to retard the effect of the movements of the sensitive diaphragm on the value of the piloting pressure.

In practice, closely related or identical values can be adopted for the sections of the supply and leakage orifices, preferably sections of diameter less than 1 mm., and better still with a diameter comprised between 3/10 and 5/10 mm. approximately.

The accompanying drawings illustrate by way of example various constructions of a regulator of air as required, according to the invention, as compared with conventional regulators of the same type.

FIG. 1 is a diagram showing the nature of the essential functions of an on-demand regulator;

FIG. 2 is a basic diagram showing the characteristics of operation of the sensitive diaphragm with respect to the valve in known types of regulator;

FIG. 3 is a basic diagram of a pneumatic valve of the kind in which the passage of the valve to the position of opening is caused by a reduction of the piloting pressure;

FIG. 4 is a cross-section of a diagrammatic construction of a regulator according to the invention, in which the valve is of the same type as shown in FIG. 3;

FIG. 5 is a cross-section to a larger scale illustrating the action of the diaphragm on the flow-rate of the nozzle;

Figure 6:
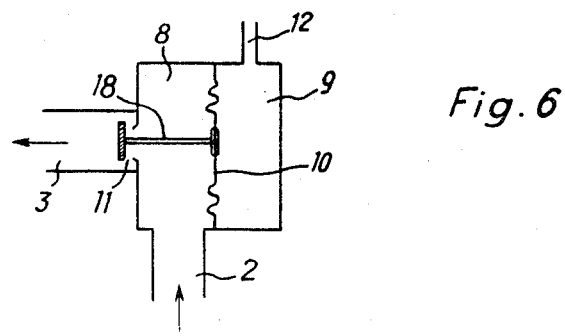
FIG. 6 is a basic diagram of a pneumatic valve of the kind in which the passage of the valve to its opening position is caused by an increase in the piloting pressure.

FIG. 1 re-states the characteristic features of any regulator of gas on-demand independently of the circuit or of the breathing apparatus which it supplies, this being done in order to simplify the examples and to avoid describing the respiratory circuit proper, which does not fall within the scope of the invention.

A regulator generally comprises a valve-mechanism unit (shown diagrammatically at 1) which is supplied through an inlet conduit 2 with a breathable gas arriving at a definite pressure P and which, through a conduit 3, is capable of transmitting this gas to a respiratory circuit (shown diagrammatically by part of a chamber A) in dependence on the intake breathing demand, which results in variations of pressure in the chamber A, these variations being transmitted to the regulator through a conduit 4, which may furthermore be partly coincident with the conduit 3.

Two types of regulators are known, namely on the one hand the regulators intended for supplying a respiratory circuit at a constant positive pressure and on the other hand those intended to supply a respiratory circuit under an inhalatory depression.

In regulators of the first type, the valve of the valve-mechanism 1 is normally in the open position, permitting a communication between the supply 2 and the outlet 3, the valve coming into the closed position under the effect of an over-pressure in this circuit, this over-pressure being transmitted to the regulator by the conduit 4. In regulators of the second type, the valve is on the contrary normally in the closed position and its change-over to the open position results from the transmission of a depression to the regulator, through the circuit 4.

These devices provide for the inhalation, breathing out being ensured by an evacuation clapper-valve B which belongs properly speaking to the respiratory circuit, although it is often fixed to the regulator. The present invention being related to the regulator itself and in particular the device 1, the descriptive examples will be limited to the assembly 1, 2, 3 and 4. In the various figures of the drawings, the corresponding elements have been given the same reference numbers.

Referring to FIG. 2, which represents diagrammatically a regulator known per se, the manner will be described in which a suction pressure transmitted by the pipe 4 ensures the operation of a valve mechanism, in this case shown by the cross-hatched portion 5, which is supplied by the conduit 2 and delivers into the respiratory circuit by the outlet 3.

This valve mechanism is contained in a casing 1 provided with a sensitive diaphragm 7 which is kinematically coupled to the valve mechanism by a mechanical transmission 6 (shown diagrammatically by a lever) effecting by its movement the direct or indirect opening or closure of the valve, by the effect of a variation of inhalation suction pressure transmitted to the casing 1 through its communication 4 with the respiratory circuit.

As has been stated above, the present invention permits, inter alia, the elimination of the mechanical coupling between the sensitive diaphragm and the valve mechanism, to the extent that the valve of this valve mechanism is of the so-called pneumatic type, namely a valve such that its operation depends on the value of a pressure.

There exists a great variety of devices which achieve this control, and the invention is applicable to all devices in which the action of the sensitive diaphragm results in a modification of the pressure existing in a chamber of the regulator, this modification of pressure acting in its turn, directly or indirectly, on the operation of the valve. It has been chosen to explain this with reference to an extremely simple device, in which this valve takes the form of an elastic wall which constitutes one of the sides of the chamber, it being understood that this arrangement is absolutely not limitative on the scope of the invention.

In order to simplify the description, the elastic wall in question will be known as a "valve" and the chamber in which is generated the pressure acting on the valve, in the present case the chamber of which the elastic wall is one side, will be called the "piloting chamber."

FIG. 3 gives in diagrammatic form a simple illustration of a pneumatic valve of this kind, composed of two chambers 8 and 9 separated by the valve wall 10 bearing against a seating 11 which forms the opening of an outlet conduit 3. When this valve is open, it puts the chamber 8, supplied through the conduit 2, into communication with the conduit 3. If the supply pressure is equal to P, there exists in the chamber 8 a pressure P which tends to open the valve. The other face of the wall valve defines the chamber 9 or piloting chamber, in which acts a control pressure $p$ of a gas which is assumed to come from a conduit 12. For a certain ratio of the sections of the valve 10 and of its seating 11, there exists a control or piloting pressure $p_0$ for which the valve is closed, any reduction of this valve $p_0$ causing the opening of the valve.

In known regulators which utilize this type of valve, the control pressure is the pressure P due to restricted communication, but up to equilibrium of the pressures in the two chambers. The sensitive diaphragm 7 (FIG. 2) then acts through the intermediary of a lever 6 on an auxiliary valve, the opening of which destroys the equilibrium of the pressures, thereby causing the opening of the valve. It should be noted that in this case, the flow resulting from the opening of the auxiliary valve is added to that of the valve proper.

In a regulator according to the invention, the variation of the piloting pressure is obtained by a simple variation of the position of the sensitive diaphragm of the regulator with respect to a nozzle or jet from which there escapes continuously an auxiliary flow of gas, without any mechanical contact being provided between the diaphragm and the nozzle.

If there is considered a chamber into which passes a certain flow of gas, the chamber being also open through a calibrated orifice or jet, there exists under operating conditions in the chamber an equilibrium pressure $p$ which only depends on the flow-rate of supply and on the value of the drop in pressure due to the outlet jet. If this outlet jet is located facing a diaphragm and at a distance from this diaphragm, so that any variation of this distance causes a disturbance of the stream of gas passing out of the jet, and in consequence a variation of the pressure-drop due to this flow, the pressure $p$ of the chamber becomes a function of the position of the diaphragm with respect to the jet nozzle.

The arrangements of the invention are based on these considerations, and FIG. 4 illustrates their application to the pneumatic valve described with reference to FIG. 3, this application thus resulting in a new regulator of the type suitable for a respiratory circuit under positive pressure.

The chamber in which the pressure $p$ is established can advantageously be the zone shown at 9 in the diagram of FIG. 3, and its constant supply can also be advantageously obtained by extracting air at the supply pressure P in the contiguous zone 8. This extraction can be effected by a suitable pipe provided between the chambers 8 and 9, or by a defect of fluid-tightness in the mounting of the diaphragm 10, or by an orifice 13 deliberately pierced in the wall 10, as shown in FIG. 4, the pipe, the defect of fluid-tightness or the orifice constituting the said gas inlet of the chamber.

According to the invention, this chamber 9 further comprises a jet outlet 14 preferably arranged at the centre and in close proximity to an elastically deformable sensitive diaphragm 15, rigidly fixed to the regulator unit by a frame 16 which holds it by its periphery. This frame, which may be of any known type, is provided with openings on the side of the face of the diaphragm which cooperates with the jet-nozzle, so that the leakage flow passing through the jet nozzle escapes normally to the exterior, and it comprises a conduit 4 at its extremity.

The piloting chamber 9 thus forms a transition zone between the two orifices 13 and 14 and under continuous working conditions, there exists in the chamber a stabilization pressure having a value $p_1$ which only depends on the ratio of these two orifices.

Conventional considerations permit this ratio to be calculated in such manner that $p_1$ is slightly less than $p_0$, which is the pressure corresponding to the closure of the valve.

For the same ratio of the sections 13 and 14, which ratio may be equal to 1 for a judicious choice of the dimensions of the valve 10 and its seating 11, the dimensions of the orifices 13 and 14 may be very small, as has been indicated above, and may be of the order of a few tenths of a millimeter. In this case, the leakage flow-rate is of the order of one-quarter of a litre per minute.

Any over-pressure in the conduit 4 thus acts on the diaphragm 15 which, through the intermediary of the jet passing from the nozzle 14, causes the piloting pressure to increase from the value $p_1$ to the value $p_0$ at which the flow of air initially passing out through the conduit 3 is cut-off by the valve.

The sensitive diaphragm can in no case touch the nozzle since for this to occur, the over-pressure which acts in the conduit 4 must reach a value such that the value of the piloting pressure $p$ which would result, exceeds the value $p_0$, until it reaches the value P of the supply pressure. Now, the cause of the increase of pressure in the respiratory circuit and in consequence in the conduit 4 which communicates with it is precisely the flow in the conduit 3, which flow becomes zero when the pressure of the circuit is such that the diaphragm controls the establishment of a pressure $p$ having a value equal to $p_0$.

The operation of the diaphragm 15 will be better understood with reference to FIG. 5, which shows how the diaphragm acts to disturb the flow from the nozzle 14 when it is acted upon by an over-pressure in the conduit 4. In fact, as this diaphragm is flexible, thin, and constantly pushed away from the nozzle by the impact of the jet delivered by this latter it attempts to envelop this jet of gas which is then deflected back, causing an additional loss of pressure at the outlet of the nozzle 14.

In order to produce regulators intended for respiratory circuits under depression, it is advisable to employ pneumatic valves in which the increase in the piloting pressure $p$ causes the opening of the valve. FIG. 6 illustrates the diagram of a valve of this kind, in which there are again shown the chambers 8 and 9, as previously, the valve-diaphragm 10, the inlet 2 of air under a pressure $p$ and the outlet 3 forming a continuation of the seating 11, but this latter is inverted as is also the valve, which is then actuated by a rod 18. For a value of the section surface of the diaphragm 10 greater than that of the seating 11, the valve is normally closed in the absence of pressure of sufficient value in the piloting chamber 9.

There exists a value $p_0$ of the pressure in this chamber at which the valve is opened, and below which the valve is closed.

Figure 7:
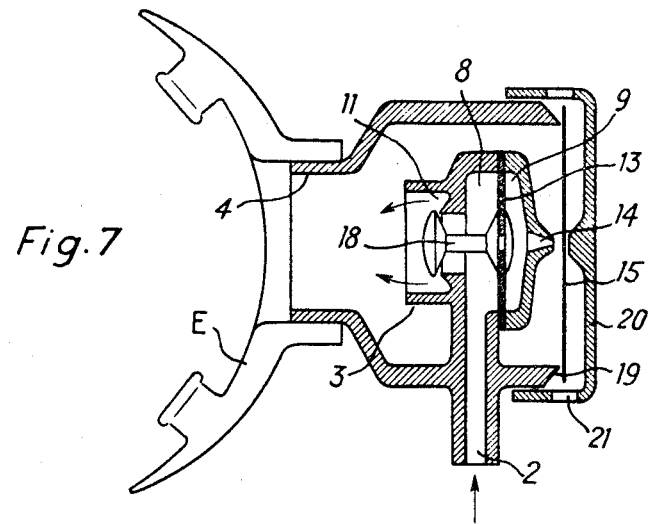
FIG. 7 is a cross-section of a diagrammatic construction of a regulator according to the invention, in which the valve is of the same type as that shown in FIG. 6.

FIG. 7 illustrates the use according to the invention of a valve of this kind for the production of a regulator for a circuit under depression which can be employed for example for under-water diving. For this purpose, the regulator has been shown in FIG. 7 equipped with a mouthpiece E.

As in the example shown in FIG. 4, there are again found the orifice 13 ensuring the auxiliary flow of air from the chamber 8 to the piloting chamber 9 and the outlet nozzle 14 of this chamber, facing the sensitive diaphragm 15. However, the valve is inverted as in the diagram of FIG. 6, by a rod 18 fixed to the diaphragm 10.

The whole unit is contained in a casing which carries the sensitive diaphragm at a distance from the nozzle, by a seating 19 on which the diaphragm rests, and the diaphragm is furthermore retained by a cover 20 provided with orifices 21.

On the side of the outlet 3 of the valve, this casing terminates in an orifice 4 for coupling to the respiratory circuit, in this case a mouthpiece E, in such manner that any depression due to inhaling acts on the diaphragm 3 and causes the change-over of the valve to the open position and produces a flow of air through the outlet 3.

This arrangement also has the advantage of comprising the breathing-out valve shown diagrammatically at B in FIG. 1. In fact, any over-pressure due to breathing-out results in the diaphragm 15 being lifted from the seating 19 by bending, and the used gas escapes freely through the orifices 21. In this regulator, the nozzle orifices 13 and 14 are calculated in such manner that the value of the stabilization pressure $p_1$ in the piloting chamber 9 is slightly less than the value of the opening pressure $p_0$. Thus, any suction due to inhalation positively creates the flow.

As has been specified above, there exists a great variety of pneumatic valves. Thus, a pressure-reducing valve such as those currently employed, can be considered as a pneumatic valve. In fact, these mechanisms control the opening of a high-pressure valve in dependence on the value of a definite and constant utilization pressure, this being obtained by the action on the valve of a calibrated diaphragm operated by this pressure.

Figure 8:
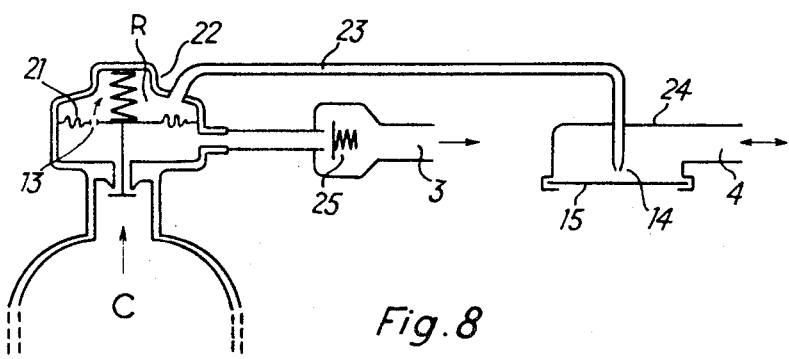
FIG. 8 is a diagram illustrating the direct application of the teaching of the invention to a pressure reducing valve.

FIG. 8 shows diagrammatically the modification, according to the teachings of the present invention, of such a pressure-reducing valve supplied by a cylinder C of gas at high pressure.

The diaphragm 21 of the pressure-reducing valve is, according to the invention, pierced with a calibrated orifice 13, as in the foregoing examples. The upper portion (comprising the calibrated spring) which is usually pierced with orifices, is made fluid-tight in order to obtain a piloting chamber R which is caused to communicate with a pipe 23 terminated by a nozzle 14 (acting as gas outlet of the piloting chamber) arranged facing a sensitive diaphragm 15 rigidly mounted in a casing 24 containing the nozzle. This casing communicates with the respiratory circuit through a conduit 4.

The normal outlet of the pressure-reducing valve, through a calibrated clapper-valve 25, communicates with a supply conduit 3 of the respiratory circuit.

If $p'$ is the initial pressure of the pressure-reducing valve and $p_1$ is the stabilization pressure in the piloting chamber, the clapper-valve 25 is calibrated according to the invention at the value $p'+p_1$. This being the case, any inhalatory suction causing an increase in $p_1$ results in the lifting of the clapper-valve 25, which has become insufficiently loaded, and there is a flow through the pipe 3.

The present invention thus permits a pressure-reducing valve to be adapted to operate as a regulator.

What is claimed is:

1. A regulator for controlling the operation of a valve in the path of a respiratory gas between a source of this gas and a breathing zone to which said gas is to be supplied, in which said operation depends on the value of a control pressure existing within a piloting chamber and varying with the position of a diaphragm sensitive to variation in breathing, said piloting chamber being provided with at least a gas inlet for continuously supplying the piloting chamber with a gas in order to obtain therein the said control pressure, said piloting chamber being provided with a gas outlet for obtaining a leakage jet of gas continuously leaking from the piloting chamber, said sensitive diaphragm being located on the outside of said piloting chamber at a position opposite and at a distance from said outlet in the path of said jet, whereby a displacement of said diaphragm modifies said pressure of gas in the piloting chamber through action on said leakage jet without mechanical contact with said diaphragm.

2. A regulator as claimed in claim 1, and further comprising a chamber provided with a conduit for supplying the chamber with the respiratory gas from said source of gas and with a conduit for putting the chamber in communication with said zone supplying the zone with said respiratory gas under the control of said valve, said chamber being in communication with said piloting chamber through said gas inlet.

3. A regulator as claimed in claim 1, in which the piloting chamber is provided with a wall arranged so as to transmit out of said piloting chamber the variations of the said pressure of gas in said piloting chamber.

4. A regulator as claimed in claim 3, in which said wall is provided with said gas inlet.

5. A regulator as claimed in claim 3, in which said wall is an elastically deformable diaphragm and is mechanically coupled to said valve.

6. A regulator as claimed in claim 1, in which said gas outlet has substantially identical sections of passage.

7. A regulator as claimed in claim 1, in which the outlet orifice has a diameter less than 1 mm., preferably comprised between $3/10$ and $5/10$ of a millimeter.

8. A regulator as claimed in claim 7, in which said gas outlet is defined by a nozzle.

9. A regulator as claimed in claim 1, wherein said sensitive diaphragm is fixed by its periphery in the regulator.

10. A regulator as claimed in claim 1, in which said sensitive diaphragm is a thin, flat, elastic disc.

11. A regulator as claimed in claim 10, in which the thickness of said disc is less than $5/10$ of a millimeter.

12. A regulator as claimed in claim 10, in which said disc has a diameter less than 5 cm.

13. A regulator as claimed in claim 1, wherein said valve is a pressure-reducing valve.

References Cited

UNITED STATES PATENTS

| | | | |
|---|---|---|---|
| 2,982,291 | 5/1961 | Glidden | 137—489 |
| 3,110,469 | 11/1963 | Becker | 251—45 |

M. CARY NELSON, Primary Examiner

ROBERT J. MILLER, Assistant Examiner